(12) United States Patent
Krishna

(10) Patent No.: US 7,131,116 B1
(45) Date of Patent: Oct. 31, 2006

(54) TRANSFORMATION OF ELECTRONIC MESSAGES TO AN EXTENSIBLE DATA FORMAT

(75) Inventor: Jai Krishna, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 613 days.

(21) Appl. No.: 10/335,452

(22) Filed: Dec. 30, 2002

(51) Int. Cl.
G06F 9/45 (2006.01)
G06F 3/00 (2006.01)
G06F 15/16 (2006.01)

(52) U.S. Cl. ........................ 717/136; 715/752; 709/203
(58) Field of Classification Search ............... None
See application file for complete search history.

(56) References Cited

U.S. PATENT DOCUMENTS

| 6,671,853 B1* | 12/2003 | Burkett et al. .............. 715/513 |
| 6,684,088 B1* | 1/2004 | Halahmi ..................... 455/566 |
| 2002/0123993 A1* | 9/2002 | Chau et al. .................... 707/5 |
| 2004/0205731 A1* | 10/2004 | Junkermann ................ 717/136 |

* cited by examiner

*Primary Examiner*—Wei Zhen
*Assistant Examiner*—Chih-Ching Chow
(74) *Attorney, Agent, or Firm*—Hickman Palermo Truong & Becker LLP (57) ABSTRACT

A method and apparatus for transformation of electronic messages to an extensible data format is provided. According to one aspect of the invention, RFC822/MIME messages are transformed to the eXtensible Markup Language (XML) data format.

21 Claims, 5 Drawing Sheets

TRANSFORMATION OF ELECTRONIC MESSAGES TO AN EXTENSIBLE DATA FORMAT

FIELD OF THE INVENTION

The present invention relates generally to computer software, and more specifically to a computerized utility for the transformation of electronic messages into an extensible data format.

BACKGROUND OF THE INVENTION

Mime

Many electronic message systems have been unable to contain objects other than structured data. To satisfy users' desires for transfer of unstructured data such as picture and audio and to bridge localized RFC822 limitations, MIME, or the Multipurpose Internet Mail Extension, was defined as an extension to the RFC822 messaging protocol in 1992. MIME was developed as a multi-purpose electronic messaging protocol to extend RFC822 for processing of electronic messages that contained structured and unstructured data and is a protocol for transmitting non-text information across the Internet. For handling of unstructured data in a messaging context, non-ASCII data is converted to ASCII for transmission and then converted back at the receiving end. MIME is a framework primarily for encapsulating and composing arbitrary data entities, and offers message handling capabilities such as content type labeling, transfer including handling arbitrary data unrestricted channels, assembly of different kinds of data into composite entities and data detection without the need for a parser to understand the data content.

MIME refers to an official Internet Engineering Task Force (IETF) standard that specifies how messages must be formatted so that they can be exchanged between different email systems. MIME is a very flexible format, permitting one to include virtually any type of file or document in an email message. Specifically, MIME messages can contain text, images, audio, video, or other application-specific data.

XML

XML, or extensible Markup Language is a W3C standard for representation of data in an extensible format. XML is a superset of the HyperText Markup Language (HTML). In XML, the presentation format is separate from the data representation. XML was developed so that richly structured documents could be used over the internet. With XML, users may specify their own tags for extraction of data, and the data is processed in a format which is highly machine-readable. XML is a meta-markup language that is fast becoming the de facto standard for exchanging data between business applications. XML is a framework primarily for describing data structures, including semi-structured document data. XML offers message-handling capabilities such as construction of arbitrary data structures based on an annotated tree model, fine-grained labeling of structure components and data attributes, cross-linking between data structure components, and a standard format for interchange of structured information between diverse systems. XML is a useful mechanism in addition to existing facilities handling messaging content that contains structured and unstructured data. With XML, structured data is maintained separately from business rules and display attributes. The standard presentation of XML document content is specified using a stylesheet language called XSL, or the eXtended Style Language. An XML DTD, or XML data type definition gives the structure for the document. DTDs use regular expressions to specify the structure of the document composition. An XML Schema specifies what the structure of the XML document looks like and what the data types for the structure for each of the elements of the document. XMLSchema specifies the structure using XML itself. Since DTDs are represented in a format different from XML, they are being phased out in favor of XMLSchemas. The W3C site [[http://www.w3c.org]]0 "w3c.org" includes the latest XML and other specifications.

Serialization

Serializing an object involves encoding its state in a structured way within a byte array. Once an object is serialized, the byte array can be manipulated in various ways; it can be written to a file, sent over a network, or stored within a database. The serialization process encodes enough information about the object type within the byte stream, allowing the original object to be easily recreated upon deserialization, at a later point in time.

Once an object is serialized, a program can store the serialized object in a file, database, or system registry. It can transmit the serialized object across a network or store it on a Web page. A remote program can read the serialized object and use it to reconstruct the object.

A program can also apply other string operations to the serialization. For example, one program might serialize an object and then encrypt the serialization. It can then send the result to a remote program that would decrypt the serialization and use it to recreate the original object.

Traditional Message-Handling Techniques

Traditionally, there was no provision for internet messaging servers, for example IMAP servers, to offer access to email in a ready-for-business extensible data processing format such as XML. Traditionally, Internet messaging, which has a logical structure, (envelope, content, headers, content headers, etc.) is flattened out into an ASCII representation. Before the message is delivered to the client, the message reader goes through the entire ASCII text of the message and reconstructs the message structure before presentation to the client. In this technique, the message reader is intimately aware of the intricacies of the RFC822/MIME format. The message reader has also gone through a series of non-trivial operations to determine the contents of the message.

This technique is sufficient where the message reader handles the complexity of message deconstruction for representation and reconstruction for presentation to the client. However, this technique is insufficient for a complex business application such as customer relationship management (CRM) applications.

For example, one form of input to a CRM application may be in the form of customer emails. These emails could potentially be arriving in the hundreds of thousands. The application would need to process these messages quickly and cleanly. A traditional email handling application's capabilities are based upon the CRM application's features and how the messages are represented. In an enterprise context, electronic messages contain data which is critical for supporting the enterprise business. Electronic messages are a convenient form of communication and a well-run business facilitates communication to and from its customers, suppliers, business prospects, partners, and other key business contacts. From a mail-based application's point of view, extracting critical electronic message data from the server should be as simple as "get all the body parts whose content-type is text/x-crm-purchase where subject is 'purchase order'". A wide variety of messages may be received, and for mail fetches such as the preceding example, the application would have to include a substantial amount of processing logic in order to process and fetch specific message content according to particular criteria.

One drawback to traditional electronic messaging delivery methods, is that neither SMTP nor other mail protocols can be used to deliver messages between applications. Traditionally, SMTP or Simple Mail Transfer Protocol has been the protocol for sending e-mail messages between servers. Most e-mail systems that send mail over the Internet use SMTP to send messages from one server to another; the messages can then be retrieved with an e-mail client using either the POP or the IMAP. In addition, SMTP is generally used to send messages from a mail client to a mail server.

Traditional electronic messaging data formats were developed with text messages in mind. For handling messages containing structured data, existing technology mainly deals with sending XML content over e-mail. In these cases, the data format for mail is RFC822/MIME defined ASCII text. XML business data is put into a standard RFC822 mail format and sent over an SMTP transport. One disadvantage of traditional techniques is that traditional conversion techniques for handling structured data are suitable where mail does not play any role other than data transport, and mail never goes into the system for processing. Traditional message handling techniques require added complexity to process messages.

Another disadvantage of traditional techniques for handling messages is that traditional techniques work well only for text-based messaging that is delivered to a text-based client. With the advent of multimedia content, messages may contain structured and unstructured data. For example, mobile devices may be amenable to structured text formats, while other devices may be amenable to various unstructured data formats, for example, audio and video content.

Based on the foregoing, it is desirable to provide improved techniques for representation of electronic messages in such a way that overcome the disadvantages of the conventional techniques such as those described above. It is desirable to provide improved techniques for automation and customization of message fetching and extraction for messages containing structured and unstructured data. It is desirable to provide improved techniques that overcome traditional message processing limitations, which reduce the complexity and processing of electronic messages. It is desirable to provide improved message handling techniques which are language and protocol independent.

SUMMARY OF THE INVENTION

Techniques are provided for transformation of electronic messages to an extensible data format.

The present invention relates generally to a method of transforming electronic messages into an extensible data format. The present invention provides techniques for representation of internet mail messages in a data format such that an application is able to fetch electronic messages in a highly customized manner without implementing its own parsing and extraction logic. In one embodiment, the present invention provides techniques for transformation of messaging content to a format that is more readily machine processable, such as XML, so that machines can perform processing and delivery of requested content. The machine directly fetches content in an extensible data format, such as XML, from a server and performs customized extraction and parsing. In one embodiment, the present invention provides a method of transforming RFC822/MIME messages to an extensible data format, such as XML.

According to other aspects, the invention encompasses a computer-readable medium, a carrier wave, an apparatus, and a system configured to carry out the foregoing functions.

BRIEF DESCRIPTION OF THE DRAWINGS

The transformation of electronic message format into an extensible data format utility of the present invention will now be illustrated by way of example, and not by way of limitation, in the figures of the accompanying drawings in which like reference numerals refer to similar elements and in which.

DETAILED DESCRIPTION OF THE PREFERRED EMBODIMENTS

In the following description, for the purposes of explanation, numerous specific details are set forth in order to provide a thorough understanding of the present invention. It will be apparent, however, to one skilled in the art that the present invention may be practiced without the specific details. In other instances, structures and devices are shown in block diagram form in order to avoid unnecessarily obscuring the present invention.

Functional Overview

The XML Serialization of RFC822/MIME Utility

XML Serialization of MIME/RFC822 Messages

The present invention relates generally to a method of transforming electronic messages into an extensible data format. The present invention provides techniques for representation of internet mail messages in a data format such that an application is able to fetch electronic messages in a highly customized manner without implementing its own parsing and extraction logic. In one embodiment, the present invention provides techniques for transformation of messaging content to a format that is more readily machine processable, such as XML so that machines can perform processing and delivery of requested content. The machine directly fetches XML content from a server and performs customized extraction and parsing. In one embodiment, the present invention provides a method of transforming RFC822/MIME messages to XML.

In one embodiment of the present invention, a method of converting messages into a more machine-readable format, which reduces message processing is provided.

One embodiment of the present invention provides a technique of customizing the message content for delivery. The technique may further include providing a method for parsing, fetching and extraction of the customized content for delivery. An XML representation of the electronic messages provides capabilities of message processing such as customized delivery of content tailored to clients, such as wireless devices.

In one embodiment of the present invention, a technique is provided for delegating complex message processing to a separate component whereby the application can make such requests to this dedicated message-processing component. For example, a processing component that is able to filter graphics, audio, and binary attachments for customized delivery to client applications. An XML data format also provides a mechanism whereby content is transparent to any standard XML parser.

In certain embodiments, a message-processing component provides a mechanism whereby the component is dedicated to processing messages in an extensible structured data format. The component is pluggable, and therefore is replaceable or upgradeable without affecting functionality of other applications.

In certain embodiments, a mechanism is provided for delivery of structured data from a wide variety of applications to the user for local computation and presentation. For example, applications can use the message format to message one another without necessitating that a wire protocol be defined.

A mechanism is provided whereby high security distributed applications can message each other. For example, in one embodiment, applications can message each other using secure multi-parts, which obviate the need for secure socket layer (SSL) channels. Security is dealt with by the message-processing component.

A mechanism is provided whereby the application is protocol independent. For example, in one embodiment, a mechanism is provided whereby transports other than SMTP can be used to deliver messages between applications.

A mechanism is provided whereby the application is language independent. For example, in one embodiment, a Java application communicating with a PL/SQL application can use the XML format as a messaging medium. The Java application creates an XML message, puts it into an XML message queue where it can be picked up by the PL/SQL application.

A mechanism is provided that supports an XML mail fetch capability for applications that are written around traditional IMAP servers.

Using these techniques, the application need not be aware of the manner in which the XML messages are processed and delivered to the application. The application may simply issue a standard XML query and the processing component delivers the relevant content to the application whilst preserving the structured format of the content. Any XML aware browser/reader/client is capable of reading the archive maintaining integrity of the source structured and unstructured data. Using these techniques enables access to email in a customized manner, which is language independent, provides a platform for mail archive publishing, message oriented middleware, and presentation publishing. These techniques also provide for secure middleware messaging.

XML Serialization of Electronic Messages

Previously, there was no provision for IMAP servers to offer access to email in a ready-for-business processing format such as XML. In one embodiment, the XML serialization of a message is performed inside the IMAP server; therefore, messages can be accessed in a highly customized manner. A benefit of XML serialization of a message being performed inside the IMAP server is that the mail is handled in a highly customized manner without having to involve transformation middleware. In certain embodiments the server is able to apply specified transforms to the XML representation, customized mail access and delivery over wireless devices, etcetera requires minimal non-complex middleware.

Representation of Electronic Messages

According to certain embodiments of the invention, delivery of electronic messages is done as XML streams rather than traditional RFC822 ASCII streams. Messages represented in XML data format enables processing of electronic messages containing structured content as well as a data format for electronic messaging for documents containing structured content. The XML data format provides an extensible structured data format for electronic messaging. An XML representation of the email provides capabilities of message processing such as customized delivery of content tailored to clients.

In one embodiment, delivery of electronic messages messaging as XML streams rather than RFC822 ASCII streams enables messages to be delivered as structured data from a wide variety of applications to the user for local computation and presentation. Additionally, the messages are delivered in an extensible structured data format, which can be read by any XML aware browser/reader/client. The client is capable of reading the archive directly, maintaining integrity of the source structured and unstructured data.

Protocol Independence

One drawback to traditional electronic messaging delivery methods, is that transports other than SMTP cannot be used to deliver messages between applications. Traditionally, SMTP or Simple Mail Transfer Protocol has been the protocol for sending e-mail messages between servers. Most e-mail systems that send mail over the Internet use SMTP to send messages from one server to another; the messages can then be retrieved with an e-mail client using either POP or IMAP. In addition, SMTP is generally used to send messages from a mail client to a mail server. In one embodiment, applications can message each other using a non-SMTP transport, for example, SOAP, AQ, etc. Since XML parsers are available in many languages, an XML data format for message representation and extraction is language and protocol independent, transports other than SMTP can be used to deliver messages between applications.

MOM and POP

According to an aspect of the present invention, a method for mail archive publishing is provided. For example, in one embodiment, if a certain set of messages requires archiving and publication, the messages may be serialized into an extensible data format, such as XML and hosted on a web server. Any XML capable client, for example a web browser would be able to access the archive. Because the message is in an extensible data format, such as XML the message retains its original structured content. Moreover, archive search and data retrieval is simplified because the message has been serialized into an extensible data format. This fits well into XML's concepts of message oriented middleware (MOM) and presentation oriented publishing (POP).

Figure 1:
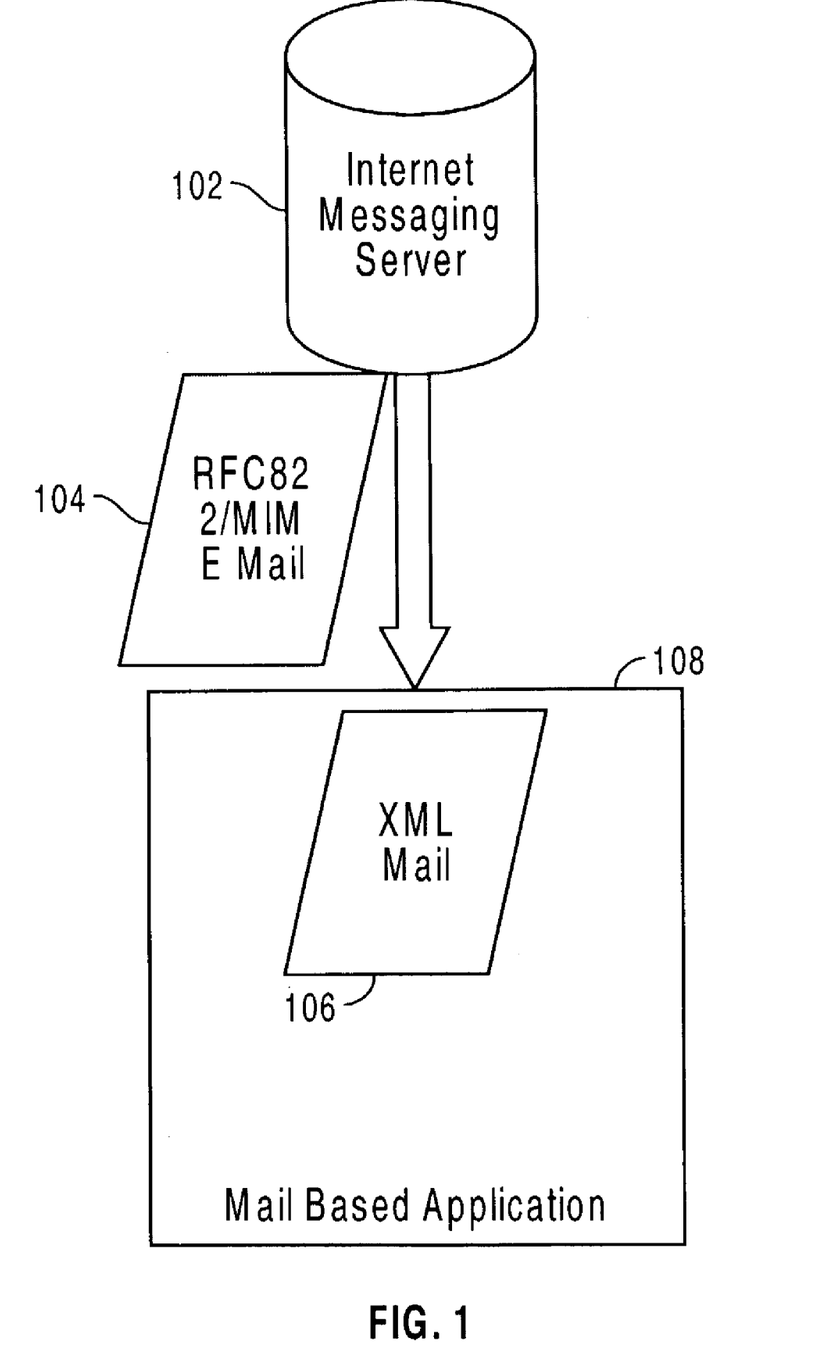
FIG. 1 is a diagram of techniques for message handling illustrating the various modules in the processing of electronic messages and presentation of content which is handled by an electronic mail based application.

FIG. 1 is a high-level block diagram of techniques for message handling which illustrates the various modules in the processing of RFC822/MIME messages and presentation of content which is handled by a mail based application. In FIG. 1, an internet messaging server 102, for example an IMAP server presents a complete electronic message in RFC822/MIME format 104 to a mail-based application 108. The XML document type is defined, and the internet messaging server 102 translates flat RFCMIME822 message 104 into an XML mail document format 106 and the XML document format is delivered along with its definition to the client application 108. The internet messaging server 102 provides the RFC822/MIME messages 104 in ASCII text format to the mail based application 108. The mail based application 108 receives the messages, and will process the messages.

Figure 2:
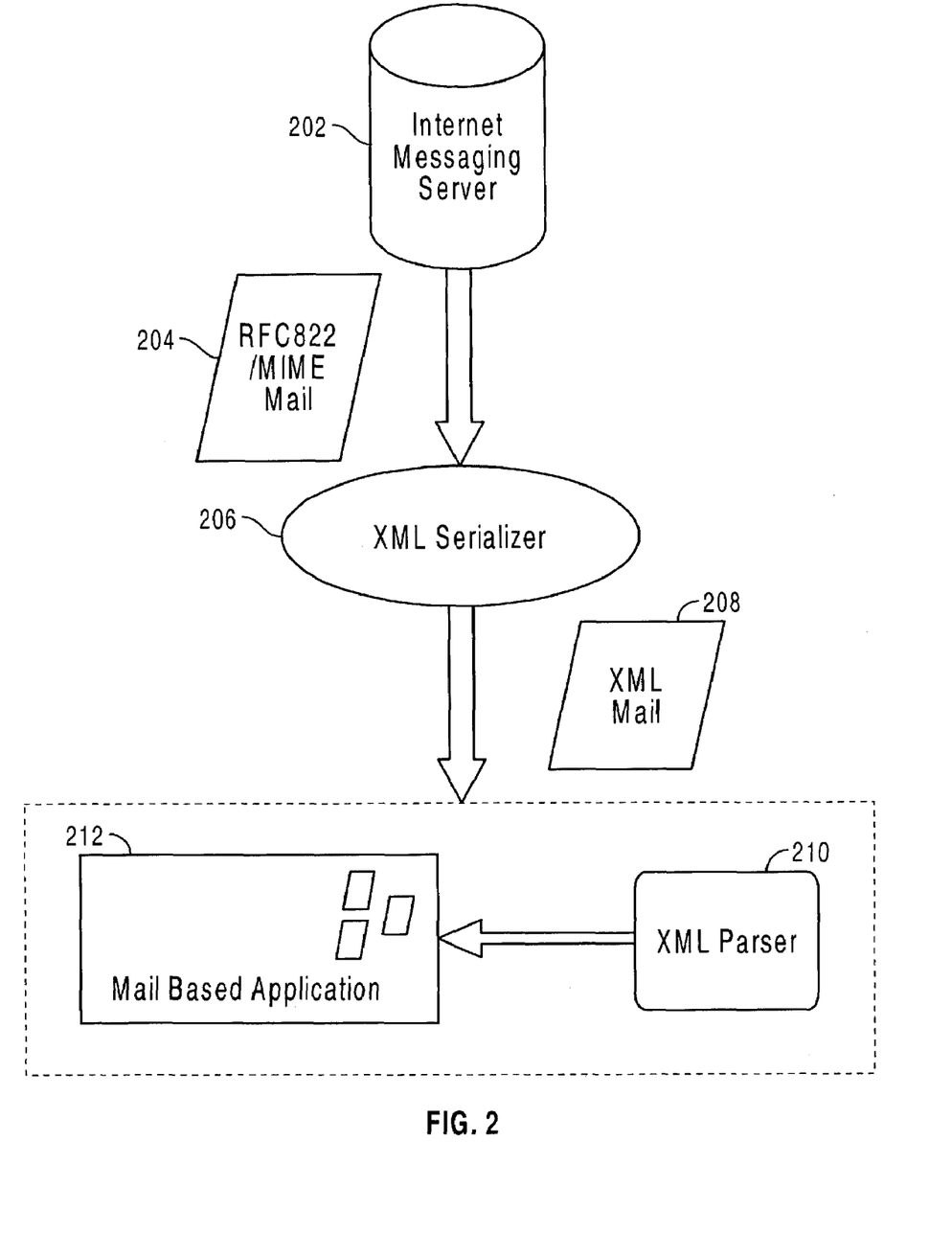
FIG. 2 is a diagram of a first embodiment employing the principles of the present invention.
Figure 3:
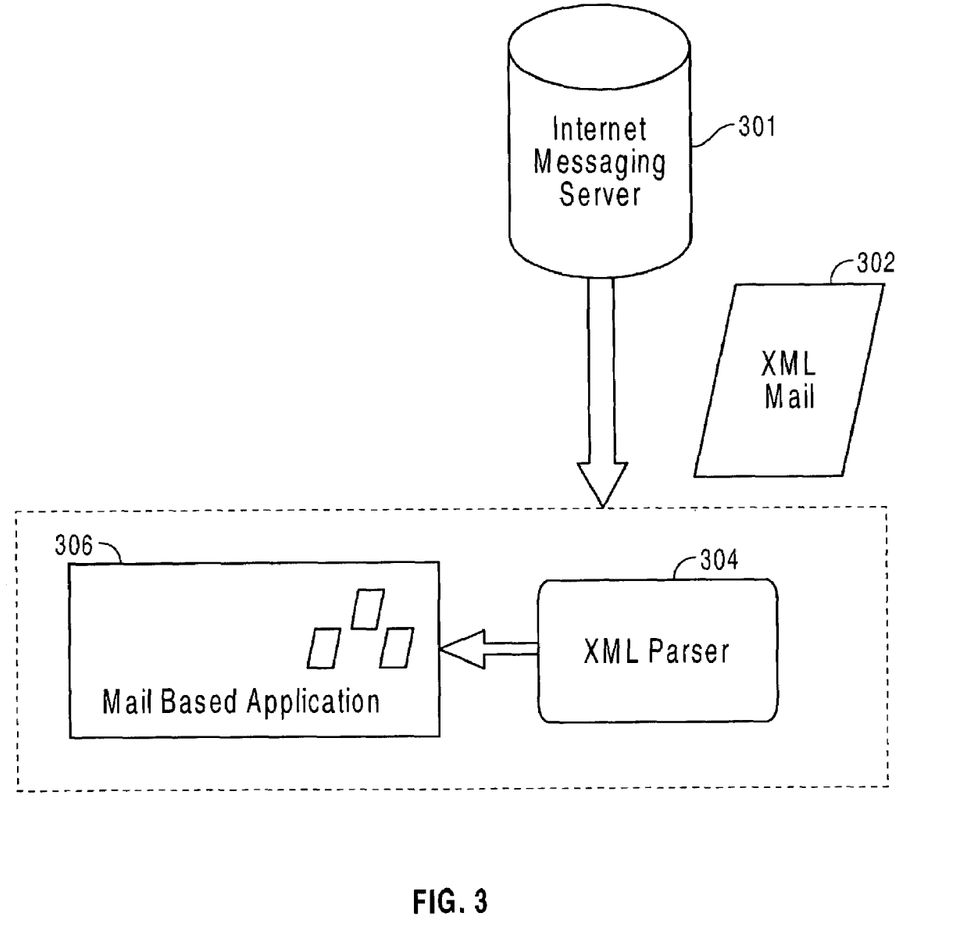
FIG. 3 is a diagram of a second embodiment illustrating an alternative embodiment of the present invention.
Figure 4:
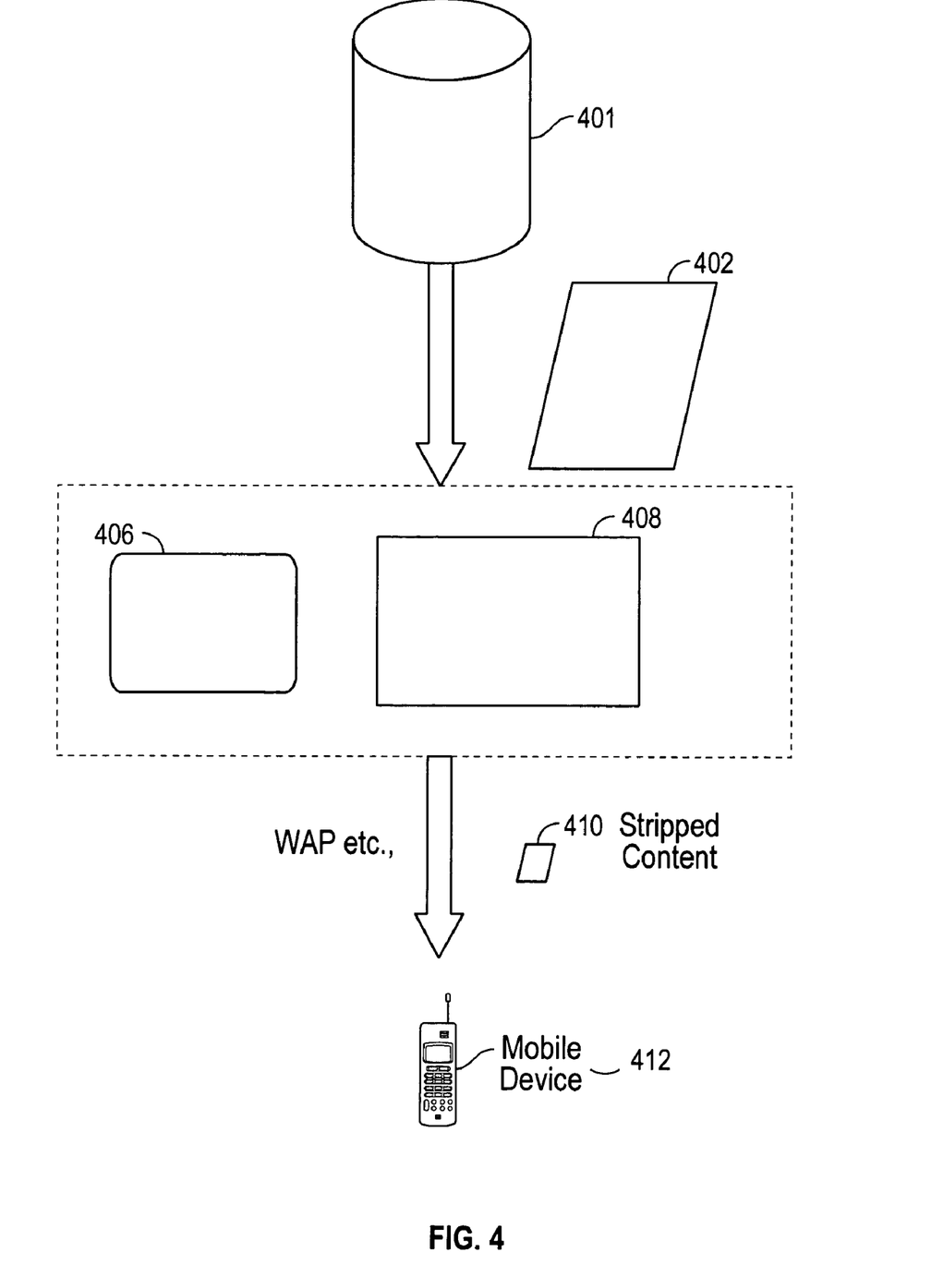
FIG. 4 is a diagram of a third embodiment illustrating an alternative embodiment of the present invention; and, FIG. 5 is a block diagram that depicts a computer system upon which embodiments of the invention may be implemented.

The complexity of the mail based application 108 in accordance with the principle of the invention is considerably reduced if the parsing is transferred to a standardized helper application, as illustrated in FIGS. 2–4. FIGS. 2–4 are a high-level block diagrams of embodiments of the present invention illustrating the various modules in the serialization of RFC822/MIME messages and presentation of content which is handled by an XML serialization component for customized message content delivery to mail based applications and delivery of customized message content to a mobile device.

FIG. 2 is a high-level block diagram of an embodiment illustrating a server serialization component, which supports XML whereby the serialization component is part of the server. In FIG. 2, the RFC822/MIME message from the IMAP server is XML serialized and is presented to the mail based application. The internet messaging server, for example an IMAP server, 202 delivers RFC822MIME message 204 to an XML serializer 206 component, which translates flat RFC822MIME message to XML mail 208. The XML mail is then parsed by an XML parser component 210, which handles mail extraction and delivers customized/requested/relevant content to the mail-based application 212. internet messaging server 202 on receipt of a request from the mail based application 212 sends an RFC822/MIME message 204 to an XML serializer 206. The XML serializer 206 transforms the message from an RFC822/MIME format to an XML format. The mail based application 212 fetches the required extracted portions of the message using a standard XML parser 210. The mail based application 212 need not implement its own parsing and extraction logic. The XML parser 210 is a pluggable component and can be replaced or upgraded without affecting the functionality of mail based application 212. The XML parser 210 performs information extraction. The mail based application 212 receives customized message information. The mail based application 212 is therefore not exposed to parsing and extraction tasks that the XML parser 210 performs. The XML parser 210 is able to do this primarily because the message has been cast into an XML format by the XML serialization component 206. Therefore, transfer of parsing and extraction to a standardized helper application, the XML parser component 210 reduces the message processing for the mail based application 212, and promotes reuse of the functionality of the XML parser 210.

The XML serializer 206 performs its functionality using standard XML mechanisms. The primary input to the XML serializer 206 is a definition of the post-serialization structure, for example, an XML document structure. The XML document structure can be described through an XML document type definition, (DTD) or XMLSchema.

FIG. 3 illustrates an example of an embodiment of the interact messaging server, for example IMAP server serialization of an electronic message support of a direct XML mail fetch. In this example, an internet messaging server 301 supports an XML format for electronic messages. In this embodiment, the XML serialization is done within internet messaging server 301. Here, internet messaging server 301 serializes the electronic message and supports a direct XML, mail fetch. The IMAP server 301 presents the message in XML format 302. The mail-based application 306 can request the message it requires from the internet messaging server 301 and can retrieve specific parts of the message utilizing XML parser 304. The internet messaging protocol currently defines a FETCH operation, the result of which is an RFC822/MIME message. The internet messaging protocol also provides for selective protocol extensions. An extension such as an X-FETCH-XML operation can be defined and implemented to allow message retrieval in XML format rather than the conventional RFC822/MIME format. In this embodiment, and example of the XML serialization capability in the internet messaging server 301 is exemplified. When messages are available in XML format from the internet messaging server itself, as illustrated in FIG. 3, it becomes much easier for an application to use a standard XML parser 304 to scan and extract content from an electronic message.

FIG. 4 is a high-level block diagram of an embodiment illustrating the serialization of RFC822/MIME messages within an internet messaging server, for example an IMAP server, which provides customized content processing and delivery, for example, delivery of customize content to mobile devices. The internet messaging server supports an XML format for electronic messages. The internet messaging server contains an XML serialization component. The IMAP server serializes electronic messages and supports a direct XML mail fetch. The XML mail is delivered to an XML parser, which handles mail extraction and delivers customized/requested/relevant content to a mobile gateway, which transforms mail into a lightweight form for delivery customized/requested/relevant content to lightweight content ready devices, such as mobile devices. In this exemplar, mobile device 412 may be any mobile device, for example a hand-held mobile device or mobile phone. The mobile device 412 requests an electronic message 402 from internet messaging server 401. The XML parser 406 scans and retrieves specific data from the electronic message 402 from the internet messaging server 401. A mobile gateway 408 transforms the data from the XML parser 406 for delivery to mobile device 412 via a compatible protocol, for example, a wireless access protocol (WAP). The mobile gateway 408 customizes the content for delivery to mobile device 412 by stripping away heavy structured content, for example video, audio, and graphical images and delivers customized stripped content 410 to the mobile device 412. When a mobile device is a consumer of the electronic message content; bandwidth, memory and heavy content, such as display intensive content. Examples of heavy content are graphics and video content, which may be transparently stripped from the message using an XML transformation as illustrated in the embodiment of FIG. 4. For example, video and graphics intensive content can be stripped from the electronic message by using an XML transformation through the eXtensible Style Language, XSL or XSL transform XSLT using a very thin adapter.

Hardware Overview

The approach for transformation of RFC822/MIME format messages to an extensible message format described herein may be implemented in a variety of ways and the invention is not limited to any particular implementation. The approach may be implemented in computer software, hardware, or a combination thereof.

Figure 5:
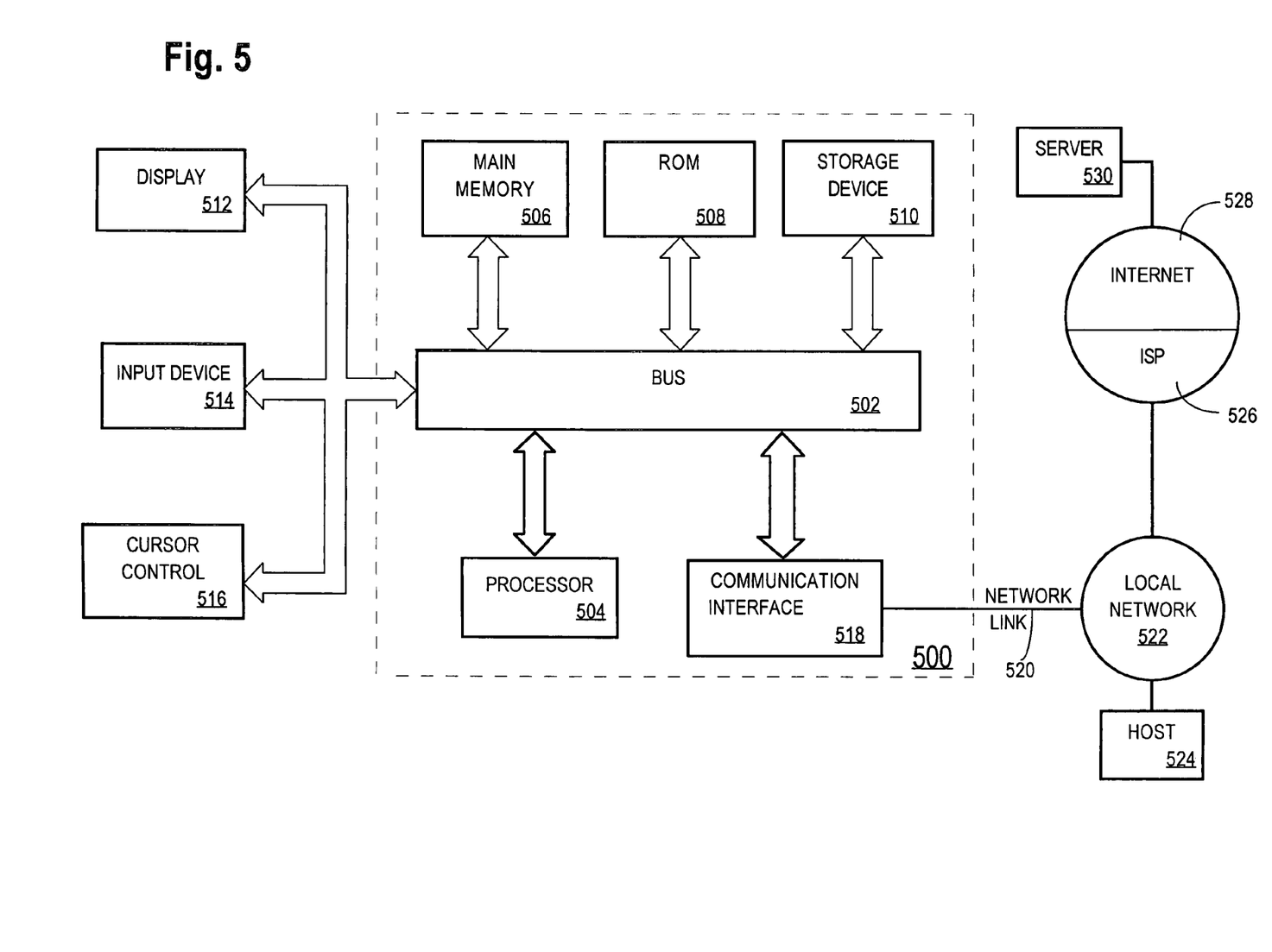

FIG. 5 is a block diagram that depicts a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

In the foregoing specification, the invention has been described with reference to specific embodiments thereof. It will, however be evident that various modifications and changes can be made thereto without departing from the broader spirit and scope of the invention. For example, the reader is to understand that the specific ordering and combination of modules and processes described herein is merely illustrative, and unless specifically indicated otherwise the invention can be performed using different or additional modules or process functions, or a different combination or ordering of modules and process functions. The specification and drawings are, accordingly, to be regarded in an illustrative rather than restrictive sense.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A computer-implemented method for transforming electronic messages to an extensible data format, the method comprising the steps of:
   receiving an electronic message at an internet messaging server;
   transforming said electronic message at an extensible data format serializer component, wherein said transforming is in response to a request for content by an electronic message based application;
   wherein, said extensible data format serializer component transforms said electronic message to an extensible data format message; and,
   wherein said electronic message based application receives said electronic message content in an extensible data format, wherein said extensible data format is the extensible Markup Language (XML) data format;
   delivering said electronic message in XML format to an XML parser that is a component of the electronic message based application;
   the XML parser handling mail extraction; and
   the XML parser delivering customized content to the electronic message based application.

2. The method of claim 1 wherein said electronic messages are in RFC822/MIME format.

3. The method of claim 1, further comprising:
   an embedded XML serialization mechanism that is responsive to said XML parser component, wherein said mechanism comprises an embedded XML serializer component within the server itself which when invoked performs said XML serialization.

4. The method of claim 1, further comprising:
   a mobile gateway mechanism that is responsive to said XML parser component, wherein said electronic message based application comprises a mobile gateway mechanism which when invoked performs transformation of electronic message data from said XML parser component for customized delivery of said electronic message by stripping heavy content for delivery to a mobile device.

5. The method of claim 1, wherein said internet messaging server of claim 1 further comprises support for XML format of electronic messages.

6. The method of claim 5 wherein said electronic message in XML format is delivered to an XML parser, which handles mail extraction and delivers requested content to said electronic message based application.

7. The method of claim 5 wherein said electronic message in XML format is delivered to an XML parser, which handles mail extraction and delivers relevant content to the electronic message based application.

8. The method of claim 1, wherein said internet messaging server further comprises an XML serialization component wherein said internet messaging server serializes said electronic messages and supports a direct XML electronic message fetch.

9. A computer system for transforming electronic messages to an
   extensible data format, the system comprising:
   a processor;
   a memory having stored instructions of the computer system causing the processor to perform the computer-implemented steps of:
   receiving an electronic message at an internet messaging server;
   transforming said electronic message at an extensible data format serializer component, wherein said transforming is in response to a request for content by an electronic message based application;
   wherein, said extensible data format serializer component transforms said electronic message to an extensible data format message; and,
   wherein said electronic message based application receives said electronic message content in an extensible data format, wherein said extensible data format is the eXtensible Markup Language (XML) data format;
   delivering said electronic message in XML format to an XML parser that is a component of the electronic message based application;
   the XML parser handling mail extraction; and
   the XML parser delivering customized content to the electronic message based application.

10. The computer system of claim 9 wherein said electronic messages are in RFC822/MIME format.

11. The computer system of claim 9, further comprising:
    an embedded XML serialization mechanism that is responsive to said XML parser component, wherein said mechanism comprises an embedded XML serializer component within the server itself which when invoked performs said XML serialization.

12. The computer system of claim 9, further comprising:
    a mobile gateway mechanism that is responsive to said XML parser component, wherein said electronic message based application comprises a mobile gateway mechanism which when invoked performs transformation of electronic message data from said XML parser component for customized delivery of said electronic message by stripping heavy content for delivery to a mobile device.

13. The computer system of claim 9, wherein said internet messaging server of claim 1 further comprises support for XML format of electronic messages.

14. The computer system of claim 13 wherein said electronic message in XML format is delivered to an XML parser, which handles mail extraction and delivers requested content to said electronic message based application.

15. The computer system of claim 13 wherein said electronic message in XML format is delivered to an XML parser, which handles mail extraction and delivers relevant content to the electronic message based application.

16. The computer system of claim 9, wherein said internet messaging server further comprises an XML serialization component wherein said internet messaging server serializes said electronic messages and supports a direct XML electronic message fetch.

17. A computer-readable storage medium carrying one or more sequences of instructions for transforming electronic messages to an extensible data format, wherein execution of the one or more instructions by one or more processors causes the one or more processors to perform the steps of:
- receiving an electronic message at an internet messaging server;
- transforming said electronic message at an extensible data format serializer component, wherein said transforming is in response to a request for content by an electronic message based application;
- wherein, said extensible data format serializer component transforms said electronic message to an extensible data format message; and,
- wherein said electronic message based application receives said electronic message content in an extensible data format, wherein said extensible data format is the eXtensible Markup Language (XML) data format;
- delivering said electronic message in XML format to an XML parser that is a component of the electronic message based application;
- the XML parser handling mail extraction; and
- the XML parser delivering customized content to the electronic message based application.

18. The storage medium according to claim 17 wherein said electronic messages are in RFC822/MIME format.

19. The storage medium according to claim 17, further comprising:
- an embedded XML serialization mechanism that is responsive to said XML parser component, wherein said mechanism comprises an embedded XML serializer component within the server itself which when invoked performs said XML serialization.

20. The storage medium according to claim 17, further comprising:
- a mobile gateway mechanism that is responsive to said XML parser component, wherein said electronic message based application comprises a mobile gateway mechanism which when invoked performs transformation of electronic message data from said XML parser component for customized delivery of said electronic message by stripping heavy content for delivery to a mobile device.

21. The storage medium according to claim 17, wherein said internet messaging server further comprises an XML serialization component wherein said internet messaging server serializes said electronic messages and supports a direct XML electronic message fetch.

* * * * *

UNITED STATES PATENT AND TRADEMARK OFFICE
CERTIFICATE OF CORRECTION

PATENT NO.        : 7,131,116 B1
APPLICATION NO. : 10/335452
DATED             : October 31, 2006
INVENTOR(S)       : Jai Krishna It is certified that error appears in the above-identified patent and that said Letters Patent is hereby corrected as shown below:

IN THE DRAWINGS
Please remove "Sheet 2 of 5" and "Sheet 3 of 5" and replace with the attached Replacement Drawings --Sheet 2 of 5-- and --Sheet 3 of 5--.

COLUMN 11

Claim 1:  Line 46, delete "extensible" and insert --eXtensible--.

The title page showing the illustrative fig. should be deleted and substituted with the attached title page Signed and Sealed this Twelfth Day of June, 2007

JON W. DUDAS
*Director of the United States Patent and Trademark Office*

(12) United States Patent
Krishna (10) Patent No.: US 7,131,116 B1
(45) Date of Patent: Oct. 31, 2006

(54) TRANSFORMATION OF ELECTRONIC MESSAGES TO AN EXTENSIBLE DATA FORMAT

(75) Inventor: Jai Krishna, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 613 days.

(21) Appl. No.: 10/335,452

(22) Filed: Dec. 30, 2002

(51) Int. Cl.
  G06F 9/45 (2006.01)
  G06F 3/00 (2006.01)
  G06F 15/16 (2006.01)
(52) U.S. Cl. .................. 717/136; 715/752; 709/203
(58) Field of Classification Search .............. None
  See application file for complete search history (56) References Cited

U.S. PATENT DOCUMENTS

| | | | |
|---|---|---|---|
| 6,671,853 B1 * | 12/2003 | Burkett et al. | 715/513 |
| 6,684,088 B1 * | 1/2004 | Halahmi | 455/566 |
| 2002/0123993 A1 * | 9/2002 | Chau et al. | 707/5 |
| 2004/0205731 A1 * | 10/2004 | Junkermann | 717/136 |

* cited by examiner

Primary Examiner—Wei Zhen
Assistant Examiner—Chih-Ching Chow
(74) Attorney, Agent, or Firm—Hickman Palermo Truong & Becker LLP (57) ABSTRACT

A method and apparatus for transformation of electronic messages to an extensible data format is provided. According to one aspect of the invention, RFC822/MIME messages are transformed to the eXtensible Markup Language (XML) data format.

21 Claims, 5 Drawing Sheets

FIG. 2

FIG. 3